United States Patent
Lederer et al.

(10) Patent No.: US 11,044,297 B2
(45) Date of Patent: Jun. 22, 2021

(54) APPARATUS AND METHOD FOR CONSTANT QUALITY OPTIMIZATION FOR ADAPTIVE STREAMING

(71) Applicant: bitmovin GmbH, Klagenfurt (AT)

(72) Inventors: Stefan Lederer, Klagenfurt (AT); Christopher Ferdinand Mueller, Villach (AT); Christian Timmerer, Klagenfurt (AT)

(73) Assignee: bitmovin GmbH, Klagenfurt (AT)

(*) Notice: Subject to any disclaimer, the term of this patent is extended or adjusted under 35 U.S.C. 154(b) by 389 days.

(21) Appl. No.: 15/044,992

(22) Filed: Feb. 16, 2016

(65) Prior Publication Data
US 2016/0234282 A1 Aug. 11, 2016

Related U.S. Application Data

(63) Continuation of application No. PCT/EP2014/067560, filed on Aug. 18, 2014.
(Continued)

(51) Int. Cl.
*H04L 29/06* (2006.01)
*H04L 12/26* (2006.01)
(Continued)

(52) U.S. Cl.
CPC .......... *H04L 65/80* (2013.01); *H04L 43/0876* (2013.01); *H04L 43/16* (2013.01);
(Continued)

(58) Field of Classification Search
CPC ...... H04L 65/80; H04L 43/0876; H04L 43/16
See application file for complete search history.

(56) References Cited

U.S. PATENT DOCUMENTS

2010/0189183 A1* 7/2010 Gu .................... H04N 21/23439
375/240.28
2010/0316126 A1* 12/2010 Chen .................... H04N 19/124
375/240.16
(Continued)

FOREIGN PATENT DOCUMENTS

| WO | 2013004260 A1 | 1/2013 |
| WO | 2013043919 A1 | 3/2013 |
| WO | 2013058684 A1 | 4/2013 |

OTHER PUBLICATIONS

Andonov, Rumen et al., "Unbounded Knapsack Problem : dynamic programming revisited European Journal of Operational Research 123: 2", http://dx.doi.org/10.1016/S0377-2217(99)00265-9, 2000, pp. 168-181.
(Continued)

*Primary Examiner* — Nicholas R Taylor
*Assistant Examiner* — Sanjoy Roy
(74) *Attorney, Agent, or Firm* — Michael A. Glenn; Perkins Coie LLP

(57) ABSTRACT

An apparatus is provided. The apparatus has an interface for receiving media information, wherein the media information indicates a segment data rate for each of a plurality of media data segments and further indicates a quality value for each of the plurality of media data segments. Moreover, the apparatus has a processor for selecting one or more selected segments from the plurality of the media data segments depending on the segment data rates of the plurality of media data segments, depending on the quality values of the plurality of media data segments and depending on an available data rate of a communication resource. The interface is configured to transmit a request requesting the one or more selected segments. Moreover, the interface is config-
(Continued)

ured to receive the one or more selected segments being transmitted on the communication resource.

16 Claims, 6 Drawing Sheets

Related U.S. Application Data

(60) Provisional application No. 61/866,608, filed on Aug. 16, 2013.

(51) Int. Cl.
  *H04N 21/845* (2011.01)
  *H04N 21/262* (2011.01)
  *H04N 21/2343* (2011.01)

(52) U.S. Cl.
  CPC ..... *H04L 65/608* (2013.01); *H04N 21/23439* (2013.01); *H04N 21/26258* (2013.01); *H04N 21/8456* (2013.01)

(56) References Cited

U.S. PATENT DOCUMENTS

| | | | |
|---|---|---|---|
| 2011/0082924 A1 | 4/2011 | Gopalakrishnan | |
| 2012/0209952 A1 | 8/2012 | Lotfallah et al. | |
| 2012/0259994 A1 | 10/2012 | Luby et al. | |
| 2013/0007223 A1* | 1/2013 | Luby | H04N 21/23106 709/219 |
| 2013/0042015 A1* | 2/2013 | Begen | H04N 19/46 709/231 |
| 2013/0091251 A1* | 4/2013 | Walker | H04N 21/6125 709/219 |
| 2013/0103849 A1* | 4/2013 | Mao | H04N 21/8456 709/231 |
| 2013/0179589 A1* | 7/2013 | McCarthy | H04N 21/8456 709/231 |
| 2013/0227158 A1* | 8/2013 | Miller | H04L 65/60 709/231 |
| 2016/0088054 A1* | 3/2016 | Hassan | H04L 65/80 709/219 |

OTHER PUBLICATIONS

Martello, S. et al., "Dynamic programming and strong bounds for the 0-1 knapsack problem", Manag. Sci., 45, 1999, pp. 414-424.

Mueller, C. et al., "Using Scalable Video Coding for Dynamic Adaptive Streaming over HTTP in Mobile Environments", Signal Processing Conference (EUSIPCO), 2012 Proceedings of the 20th European, 2012, pp. 2208-2212.

Mueller, Christopher et al., "An Evaluation of Dynamic Adaptive Streaming over HTTP in Vehicular Environments", Proceedings of the 4th Workshop on Mobile Video in MoVid '12, New York, NY, USA, ACM., 2012, pp. 37-42.

Sandvine, "Global Internet Phenomena Report 1H 2013", Sandvine Intelligent Broadband Networks, 2013.

Schonfeld, E., "2011, Netflix Now the Largest Single Source of Internet Traffic in North America, Tech Crunch", Available: http://techcrunch.com/2011/05/17/netflix-largest-internet-traffic/ (last access: May 2012), May 17, 2011.

Sodagar, I., "The MPEG-DASH Standard for Multimedia Streaming Over the Internet", IEEE MultiMedia, vol. 18, No. 4, 2011, pp. 62-67.

Stockhammer, T., "Dynamic Adaptive Streaming over HTTP—Design Principles and Standards", In Proceedings of the Second Annual ACM Conference on Multimedia Systems (MMSys11), ACM, New York, NY, USA,, 2011, pp. 133-144.

ISO/IEC 23009-1: 2012 (E), "Information technology—Dynamic adaptive streaming over HTTP (DASH)—Part 1: Media presentation description and segment formats", First edition, Apr. 1, 2012, 132 pages.

Martello, S. et al., "A mixture of dynamic programming and branch-and-bound for the subset-sum problem", Management Science, vol. 30 No. 6, Jun. 1984, pp. 765-771.

Martello, S. et al., "Knapsack Problems: Algorithms and Computer Implementation", John Wiley and Sons, 1990, 306 pages.

Pateau, G. et al., "A hybrid algorithm for the 0-1 knapsack problem", Methods of Oper. Res., 49:, 1985, pp. 277-293.

Zhang, Shaobo et al., "Out of Band Signalling for Quality Driven Adaptation", International Organisation for Standardisation, ISO/IEC JTC1/SC29/WG11, Coding of Moving Pictures and Audio, Geneva, Switzerland, Jan. 2013, 4 pages.

Zhang, Shaobo et al., "In Band Signalling for Quality Driven Adaptation", International Organisation for Standardisation, Organisation Internationale De Normalitisation, ISO/IEC JTC1/SC29/WG11, Coding of Moving Pictures and Audio, MPEG2013/m28168, Geneva, Switzerland, Jan. 2013, 4 pages.

\* cited by examiner

| 1mbps | 0.32 | 0.25 | 0.58 | 0.57 | 2mbps | 0.62 | 0.37 | 0.68 | 0.65 | 4mbps | 0.82 | 0.64 | 0.92 | 0.89 |
|---|---|---|---|---|---|---|---|---|---|---|---|---|---|---|
| SDR $S_L$ | QV $S_{L,0}$ | QV $S_{L,1}$ | QV $S_{L,2}$ | QV $S_{L,3}$ | SDR $S_M$ | QV $S_{M,0}$ | QV $S_{M,1}$ | QV $S_{M,2}$ | QV $S_{M,3}$ | SDR $S_H$ | QV $S_{H,0}$ | QV $S_{H,1}$ | QV $S_{H,2}$ | QV $S_{H,3}$ |

FIG 6

APPARATUS AND METHOD FOR CONSTANT QUALITY OPTIMIZATION FOR ADAPTIVE STREAMING

CROSS-REFERENCE TO RELATED APPLICATIONS

This application is a continuation of copending International Application No. PCT/EP2014/067560, filed Aug. 18, 2014, which claims priority from U.S. Provisional Application No. 61/866,608, filed Aug. 16, 2013, which are each incorporated herein in its entirety by this reference thereto.

BACKGROUND OF THE INVENTION

The present invention relates to data streaming technologies, and, in particular, to an apparatus and method for constant quality optimization for adaptive streaming.

From a content perspective, multimedia is omnipresent in the Internet, e.g., producing 62% of the total Internet traffic in North America's fixed access networks [1] and with the streaming operator Netflix a largest single source of traffic on the web [2]. Today's dominant proprietary adaptive media streaming systems, such as Apple HTTP Live Streaming (HLS), Microsoft Smooth Streaming or Adobe HTTP Adaptive Streaming, are based on the common approach of leveraging existing, cost-efficient and scalable HTTP-based Internet infrastructures, which are consequently based on the Transmission Control Protocol (TCP) and the Internet Protocol (IP).

Especially the adaptive delivery of multimedia content over HTTP is gaining more and more momentum and resulted in the standardization of MPEG-DASH [3], which stands for Dynamic Adaptive Streaming over HTTP. DASH may get a lot of attention in the upcoming years and probably will become an important as well as company-independent streaming standard for various types of devices like PCs, Smartphones, SmartTVs, etc. [4], [5]. The basic idea is to break up the media file into segments of equal length which can be encoded at different resolutions, bitrates, etc. The segments will be stored on an ordinary Web server and can be accessed through HTTP GET requests from the client. As a consequence, this streaming system is pull based and the entire streaming logic is on the client side. This means that the client fully controls the bitrate of the streaming media on a per segment basis which has several advantages, e.g., the client knows its bandwidth requirements and capabilities such as codecs, resolution, and language best. In this context, research focuses on efficient adaptation algorithms which perform well in different environments like, e.g., mobile networks, congested networks, etc.

Thanks to the stateless design of HTTP, this system scales very well because the content can be simply distributed utilizing Content Delivery Networks (CDNs). In order to describe the relationship between the media segments and the corresponding bitrate, resolution, and timeline, the Media Presentation Description (MPD) was introduced. The MPD is typically the first object that will be downloaded, since with the information provided via the MPD the client is able to start the session and dynamically adapt to bandwidth fluctuations, if needed.

SUMMARY

According to an embodiment, an apparatus may have: an interface for receiving media information, wherein the media information indicates a segment data rate for each of a plurality of media data segments and further indicates a quality value for each of the plurality of media data segments, and a selector for selecting one or more selected segments from the plurality of the media data segments depending on the segment data rates of the plurality of media data segments, depending on the quality values of the plurality of media data segments and depending on an available data rate of a communication resource, wherein the interface is configured to transmit a request requesting the one or more selected segments, and wherein the interface is configured to receive the one or more selected segments being transmitted on the communication resource.

According to another embodiment, an apparatus may have: a processor for generating media information so that the media information indicates a segment data rate for each of a plurality of media data segments and further indicates a quality value for each of the plurality of media data segments, and an interface for transmitting the media information, wherein the interface is configured to receive a request requesting one or more selected segments from the plurality of media data segments, and wherein the interface is configured to transmit the one or more selected segments when the request requesting the one or more requested segments is received.

According to another embodiment, a system may have: an apparatus for receiving selected segments, and an apparatus for transmitting the selected segments, wherein the processor of the apparatus for transmitting the selected segments is configured to generate media information so that the media information indicates a segment data rate for each of a plurality of media data segments and further indicates a quality value for each of the plurality of media data segments, wherein the interface of the apparatus for transmitting the selected segments is configured to transmit the media information to the apparatus for receiving the selected segments, wherein the interface of the apparatus for receiving the selected segments is configured to receive the media information from the apparatus for transmitting the selected segments, wherein the selector of the apparatus for receiving the selected segments is configured to select one or more selected segments from the plurality of the media data segments depending on the segment data rates of the plurality of media data segments, depending on the quality values of the plurality of media data segments and depending on an available data rate of a communication resource, wherein the interface of the apparatus for receiving the selected segments is configured to transmit a request requesting the one or more selected segments, wherein the interface of the apparatus for transmitting the selected segments is configured to receive the request requesting one or more selected segments from the plurality of available segments, wherein the interface of the apparatus for transmitting the selected segments is configured to transmit the one or more selected segments when the request requesting the one or more requested segments is received, and wherein the interface of the apparatus for receiving the selected segments is configured to receive the one or more selected segments being transmitted on the communication resource.

According to still another embodiment, a bit stream may have: segment data rate information indicating one or more segment data rates for the plurality of media data segments, and quality information indicating one or more quality values for the plurality of media data segments.

According to another embodiment, a method may have the steps of: receiving media information, wherein the media information indicates a segment data rate for each of a plurality of media data segments and further indicates a quality value for each of the plurality of media data segments, selecting one or more selected segments from the plurality of the media data segments depending on the segment data rates of the plurality of media data segments, depending on the quality values of the plurality of media data segments and depending on an available data rate of a communication resource, transmitting a request requesting the one or more selected segments, and receiving the one or more selected segments being transmitted on the communication resource.

According to another embodiment, a method may have the steps of: generating media information so that the media information indicates a segment data rate for each of a plurality of media data segments and further indicates a quality value for each of the plurality of media data segments, transmitting the media information, receiving a request requesting one or more selected segments from the plurality of media data segments, and transmitting the one or more selected segments when the request requesting the one or more requested segments is received.

Another embodiment may have a computer program for implementing the above methods when being executed on a computer or signal processor.

An apparatus is provided. The apparatus comprises an interface for receiving media information, wherein the media information indicates a segment data rate for each of a plurality of media data segments and further indicates a quality value for each of the plurality of media data segments. Moreover, the apparatus comprises a selector for selecting one or more selected segments from the plurality of the media data segments depending on the segment data rates of the plurality of media data segments, depending on the quality values of the plurality of media data segments and depending on an available data rate of a communication resource. The interface is configured to transmit a request requesting the one or more selected segments. Moreover, the interface is configured to receive the one or more selected segments being transmitted on the communication resource.

For example, the selector may, e.g., be configured to select the one or more selected segments from the plurality of the media data segments by conducting an analysis which combination possibilities of the media data segments exist for the next x segments (x≥1, for example, x≥2), e.g., so that the bandwidth restrictions, e.g., at the apparatus (client) are satisfied (in other words, depending on the available data rate of the communication resource). The available data rate of the communication resource may, e.g., be the data rate that is available for communication for the apparatus, e.g. for receiving media data segments from another apparatus.

Moreover, another apparatus is provided. The apparatus comprises a processor for generating media information so that the media information indicates a segment data rate for each of a plurality of media data segments and further indicates a quality value for each of the plurality of media data segments. Furthermore, the apparatus comprises an interface for transmitting the media information. The interface is configured to receive a request requesting one or more selected segments from the plurality of media data segments. Moreover, the interface is configured to transmit the one or more selected segments when the request requesting the one or more requested segments is received.

Furthermore, a system is provided. The system comprises an apparatus for transmitting selected segments as described above, and an apparatus for receiving the selected segments as described above. The processor of the apparatus for transmitting the selected segments is configured to generate media information so that the media information indicates a segment data rate for each of a plurality of selected segments and further indicates a quality value for each of the plurality of selected segments. The interface of the apparatus for transmitting the selected segments is configured to transmit the media information to the apparatus for receiving the selected segments. The interface of the apparatus for receiving the selected segments is configured to receive the media information from the apparatus for transmitting selected segments. The processor of the apparatus for receiving the selected segments is configured to select one or more selected segments from the plurality of the selected segments depending on the segment data rates of the plurality of media data segments, depending on the quality values of the plurality of media data segments and depending on an available data rate of a communication resource. The interface of the apparatus for receiving the selected segments is configured to transmit a request requesting the one or more selected segments. The interface of the apparatus for transmitting the selected segments is configured to receive the request requesting one or more selected segments from the plurality of available segments. The interface of the apparatus for transmitting the selected segments is configured to transmit the one or more selected segments when the request requesting the one or more requested segments is received. The interface of the apparatus for receiving the selected segments is configured to receive the one or more selected segments being transmitted on the communication resource.

Furthermore, a bit stream is provided. The bit stream comprises segment data rate information indicating one or more segment data rates for the plurality of media data segments, and quality information indicating one or more quality values for the plurality of media data segments.

Moreover, a method is provided. The method comprises:
Receiving media information, wherein the media information indicates a segment data rate for each of a plurality of media data segments and further indicates a quality value for each of the plurality of media data segments.
Selecting one or more selected segments from the plurality of the media data segments depending on the segment data rates of the plurality of media data segments, depending on the quality values of the plurality of media data segments and depending on an available data rate of a communication resource.
Transmitting a request requesting the one or more selected segments. And:
Receiving the one or more selected segments being transmitted on the communication resource.

For example, selecting the one or more selected segments from the plurality of the media data segments may, e.g., be conducted by conducting an analysis which combination possibilities of the media data segments exist for the next x segments (x≥1, for example, x≥2), e.g., so that the bandwidth restrictions, e.g., at the apparatus (client) are satisfied (in other words, depending on the available data rate of the communication resource). The available data rate of the communication resource may, e.g., be the data rate that is available for communication for the apparatus, e.g. for receiving media data segments from another apparatus.

Furthermore, another method is provided. The method comprises:
Generating media information so that the media information indicates a segment data rate for each of a plurality of media data segments and further indicates a quality value for each of the plurality of media data segments.
Transmitting the media information.
Receiving a request requesting one or more selected segments from the plurality of media data segments. And:

Transmitting the one or more selected segments when the request requesting the one or more requested segments is received.

Moreover, a computer program for implementing the above-described method when being executed on a computer or signal processor is provided.

BRIEF DESCRIPTION OF THE DRAWINGS

In the following, embodiments of the present invention are described in more detail with reference to the Figures, in which:

FIG. 6 illustrates a bit stream according to an embodiment.

DETAILED DESCRIPTION OF THE INVENTION

Figure 1:
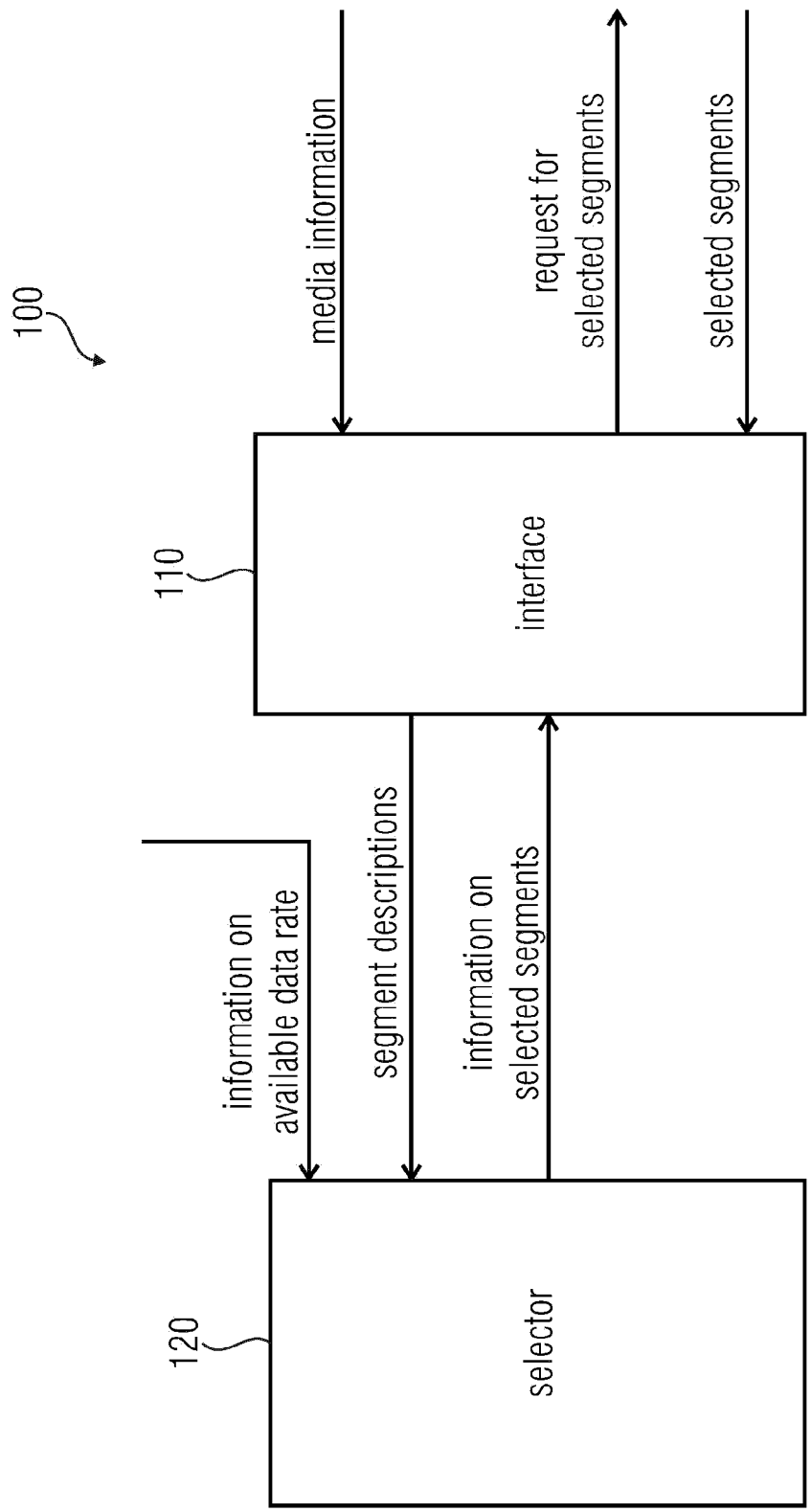
FIG. 1 illustrates an apparatus for receiving selected segments according to an embodiment.

FIG. 1 illustrates an apparatus 100 according to an embodiment.

The apparatus 100 comprises an interface 110 for receiving media information. The media information indicates a segment data rate for each of a plurality of media data segments and further indicates a quality value for each of the plurality of media data segments.

Moreover, the apparatus 100 comprises a selector 120 for selecting one or more selected segments from the plurality of the media data segments depending on the segment data rates of the plurality of media data segments, depending on the quality values of the plurality of media data segments and depending on an available data rate of a communication resource.

The interface 110 is configured to transmit a request requesting the one or more selected segments. Moreover, the interface 110 is configured to receive the one or more selected segments being transmitted on the communication resource.

Media data segments may, for example, comprise encoded video data, or encoded audio data. In other embodiments, media data segments may, for example, comprise encoded image data, encrypted text data, plain text data, or any other kind of media data. The term "media data" is understood to be equal to the term "user data" or "useful data".

As described above, the media information indicates a segment data rate for each of a plurality of media data segments. For example, the media information may, e.g., comprise for each of the plurality of media data segments value indicating the data rate of said media data segment (one value for each media data segment).

Or, the media information may comprise a single data rate value indicating the data rate of a group of two or more segments of the plurality of media data segments (one value for two or more media data segments). By this, bandwidth may be saved. This single data rate then indicates a segment data rate for each of the two or more media data segments it relates to. For example, a first data rate value may specify the data rate for a first subset of ten of the media data segments. A second data rate value may specify the data rate for a second subset of another ten of the media data segments. And a third data rate value may specify the data rate for a third subset of ten further media data segments. The media information may then comprise these three data rate values and may, by comprising these three data rate values, indicate a segment data rate for each of the 30 media data segments (the first data rate value specifies the data rate for the first ten segments, the second data rate value specifies the data rate for the subsequent ten segments, and the third data rate value specifies the data rate for the last ten segments).

The data rate value may, for example, be expressed as bits per second (bps), kilobits per second (kbps), megabits per second (mbps), kilobytes per second, megabytes per second, or the like.

In other embodiments, however, the data rate values may be specified by a segment size, for example, a size specified in Bits, Kilobits, Megabits, Kilobytes, Megabytes, or the like. For example, when an audio stream or a video stream is transmitted by the media data segments, and if it is known that a media data segment, for example, encodes a defined time of the audio stream or of the video stream (for example, two seconds), then, by dividing the size of the media data segment by the time the segment encodes, the segment data rate is obtained. Thus, in such an example, the media information indicates the segment data rate by specifying segment size of the media data segments. For example, the media information may comprise a data size value for each of the media data segments. Or, in another embodiment, the media information may, e.g., comprise one or more data size values, which each specify a data size for two or more of the media data segments.

Regarding the quality values, the quality value of each of the plurality of media data segments may, for example, depend on or indicate a peak signal-to-noise ratio, a structured similarity value, a mean opinion score, a quality metric retrieved by perceptual evaluation of video quality, a quality metric retrieved by a media delivery index, or a quantization parameter of an available segment of the plurality of available segments of the media data.

In contrast to other apparatuses, the apparatus of FIG. 1 does not only receive data rate information, for example, a data rate information, but does also receive quality information. Moreover, in contrast to other apparatuses, in embodiments, such a data rate value may, e.g., be segment specific, and is, e.g., not necessarily static for the whole data stream, but may, e.g., change for each considered segment.

Moreover, the selector 120 then is configured to select one or more selected segments from the plurality of the media data segments depending on the segment data rates of the plurality of media data segments, depending on the quality values of the plurality of media data segments and depending on an available data rate of a communication resource. Not only the data rate information, but also the quality information is taken into account.

State of the art apparatuses allow a user to select a data rate for transmission of a data stream. Then, all stream segments are transmitted depending on the selected data rate.

Embodiments of the present invention are based on the finding that segments having the same data size may have different qualities.

For example, in video coding, a lot of images of the video are encoded by employing differential coding concepts. For example, a lot of images of the video are encoded by employing P-frames, which, in contrast to I-frames, only encode the changes between two images. If, for example, only minor changes (little changes) occur between two images, then, few bits are needed to encode the P-frame. However, if major changes (a lot of changes) occur between two images, then, a lot of bits are needed to encode the P-frame. This means, if the same number of bits is available for encoding an image, in some cases, where only little changes between images occur, the images may, e.g., be transmitted with a high quality. However, in cases, where a lot of changes between images occur, the quality may, e.g., be low, although the same number of bits has been employed to encode the images.

Embodiments, however, allow, to not only take a data rate information into account, but also take quality information into account. By this, it becomes possible on a client-side to maintain a stable media quality by adaptively requesting respective segments from a server. By this, an available data rate of a communication resource, for example, a transmission path from a server to a client can be optimally utilized.

Figure 2:
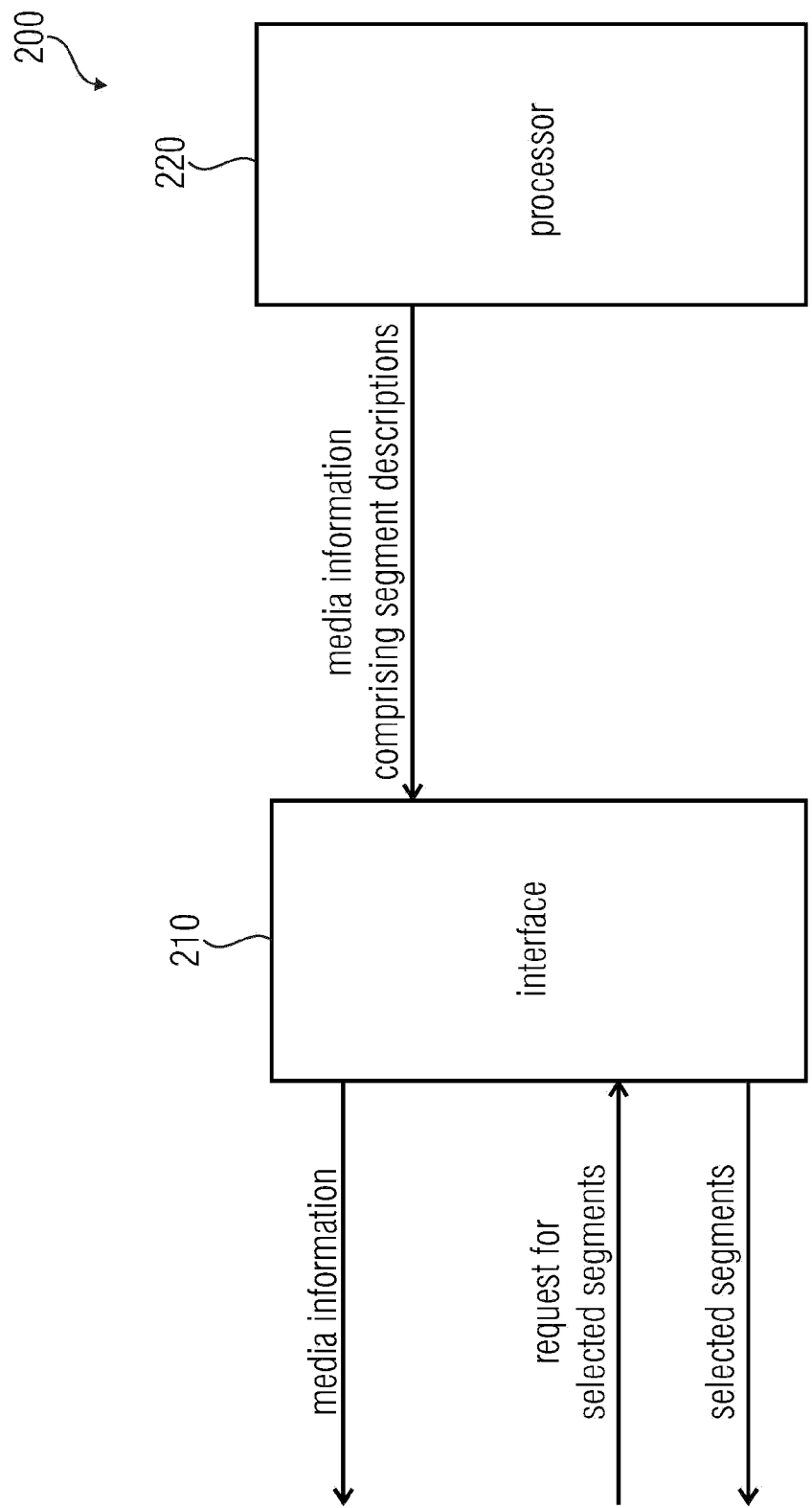
FIG. 2 illustrates an apparatus for transmitting selected segments according to an embodiment.

FIG. 2 illustrates an apparatus 200 according to another embodiment.

The apparatus 200 comprises a processor 220 for generating media information so that the media information indicates a segment data rate for each of a plurality of media data segments and further indicates a quality value for each of the plurality of media data segments.

Furthermore, the apparatus 200 comprises an interface 210 for transmitting the media information.

The interface 210 is configured to receive a request requesting one or more selected segments from the plurality of media data segments. Moreover, the interface 210 is configured to transmit the one or more selected segments when the request requesting the one or more requested segments is received.

Figure 3:
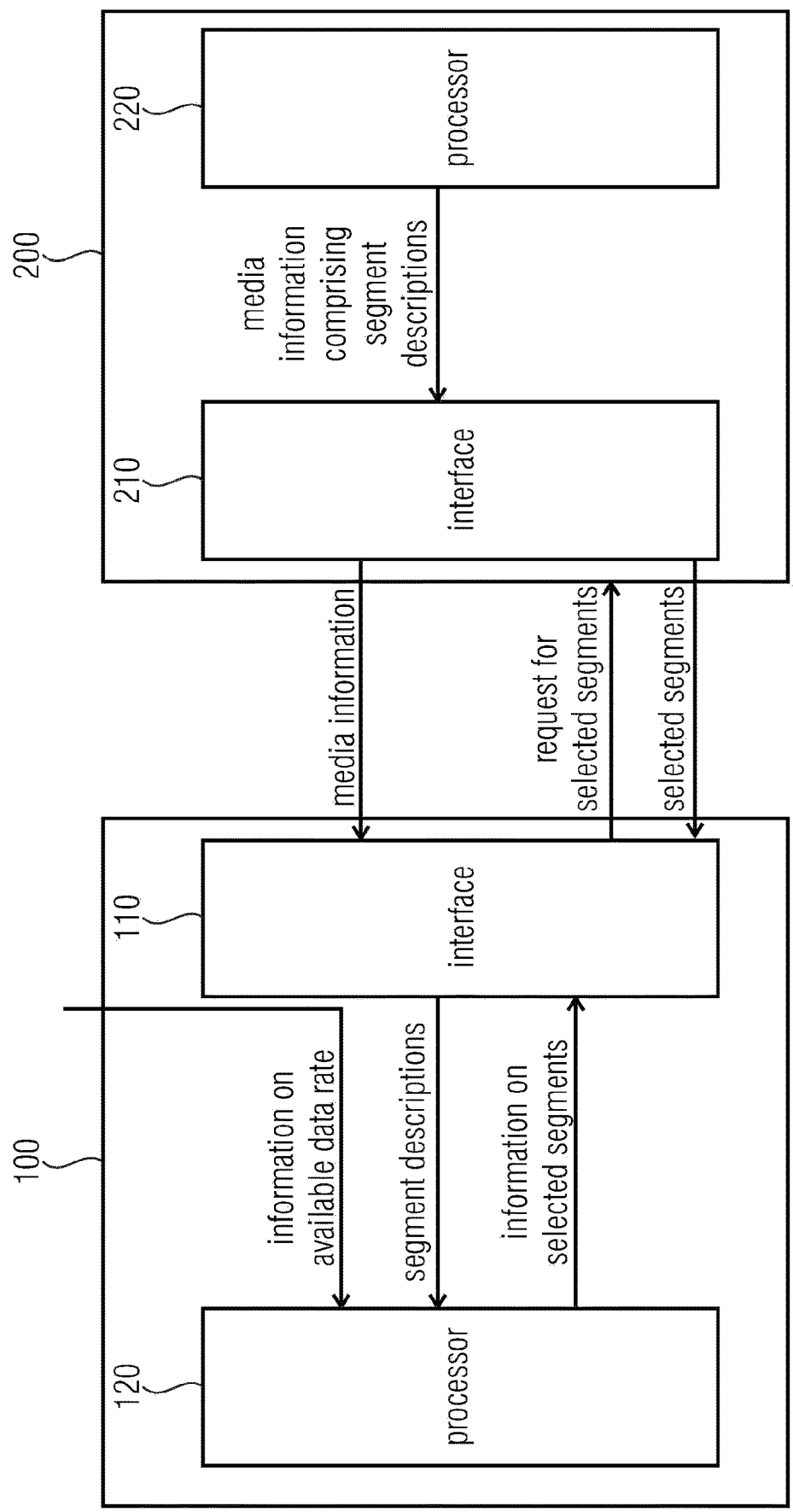
FIG. 3 illustrates a system according to an embodiment comprising an apparatus for transmitting selected segments according to an embodiment and an apparatus for transmitting selected segments according to an embodiment.

FIG. 3 illustrates a system according to an embodiment. The system comprises an apparatus 200 for transmitting selected segments as described above, and an apparatus 100 for receiving the selected segments as described above.

The processor 220 of the apparatus 200 for transmitting the selected segments is configured to generate media information so that the media information indicates a segment data rate for each of a plurality of selected segments and further indicates a quality value for each of the plurality of selected segments. The interface 210 of the apparatus 200 for transmitting the selected segments is configured to transmit the media information to the apparatus 100 for receiving the selected segments.

The interface 110 of the apparatus 100 for receiving the selected segments is configured to receive the media information from the apparatus 200 for transmitting selected segments. The selector 120 of the apparatus 100 for receiving the selected segments is configured to select one or more selected segments from the plurality of the selected segments depending on the segment data rates of the plurality of media data segments, depending on the quality values of the plurality of media data segments and depending on an available data rate of a communication resource. The interface 110 of the apparatus 100 for receiving the selected segments is configured to transmit a request requesting the one or more selected segments.

The interface 210 of the apparatus 200 for transmitting the selected segments is configured to receive the request requesting one or more selected segments from the plurality of available segments. The interface 210 of the apparatus 200 for transmitting the selected segments is configured to transmit the one or more selected segments when the request requesting the one or more requested segments is received.

The interface 110 of the apparatus 100 for receiving the selected segments is configured to receive the one or more selected segments being transmitted on the communication resource.

Figure 4:
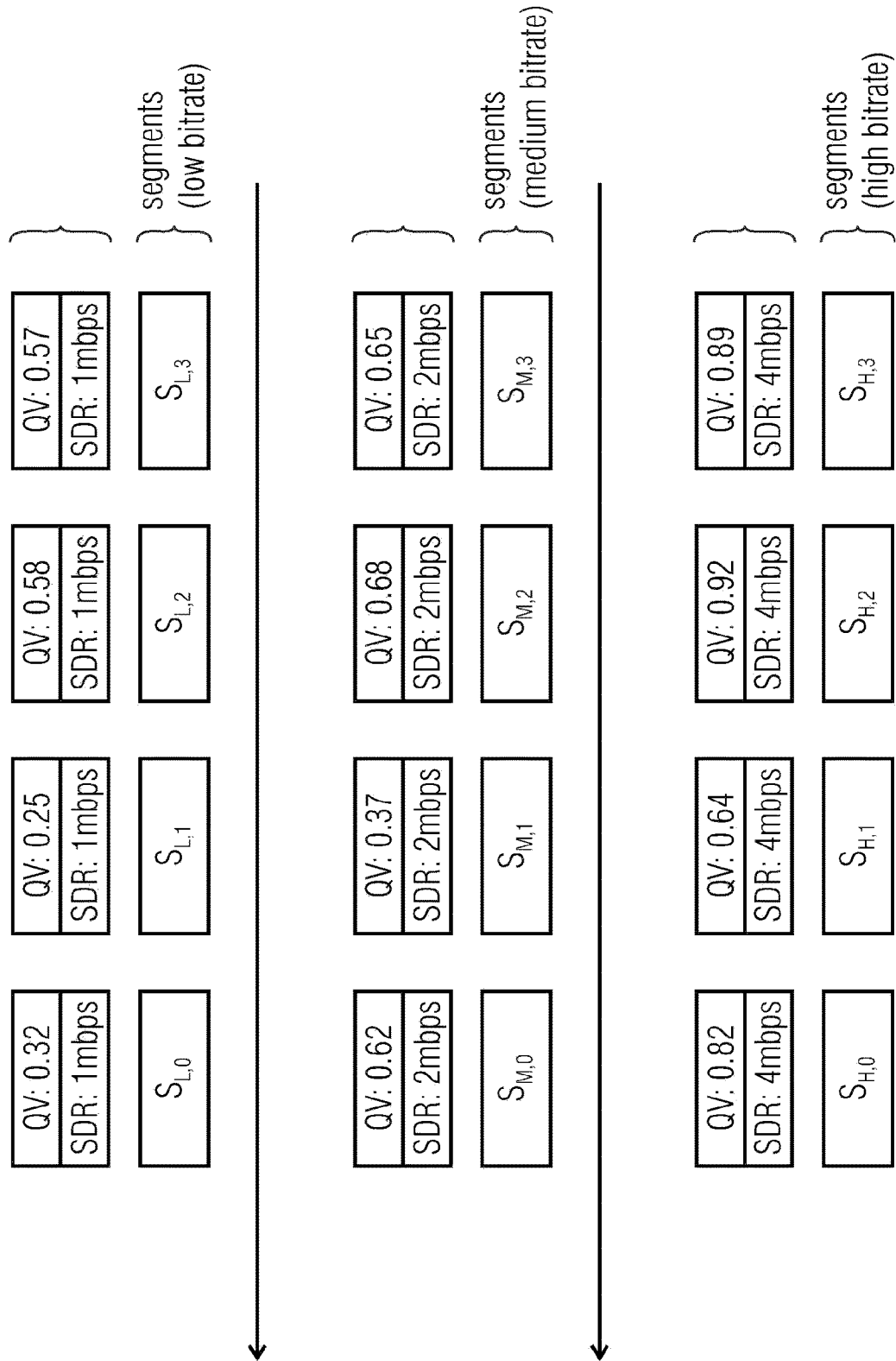
FIG. 4 illustrates an example according to an embodiment, where the apparatus for transmitting selected segments provides three data streams.

FIG. 4 illustrates an example, where the apparatus 200 for transmitting selected segments provides three data streams, e.g., video streams, comprising the same video but with three different bitrates, namely a low bit rate (top of FIG. 4), a medium bitrate (FIG. 4, middle), and a high bitrate (bottom of FIG. 4). The low bitrate is 1 mbps (megabits per second), the medium bitrate is 2 mbps and the high bitrate is 4 mbps.

In the example of FIG. 4, four segments of each of the three video streams are illustrated. The low bitrate video stream comprises the segments $s_{L,0}$, $s_{L,1}$, $s_{L,2}$, $s_{L,3}$, the medium bitrate video stream comprises the segments $s_{M,0}$, $s_{M,1}$, $s_{M,2}$, $s_{M,3}$, and the high bitrate video stream comprises the segments $s_{H,0}$, $s_{H,1}$, $s_{H,2}$, $s_{H,3}$.

The segments $s_{L,0}$, $s_{M,0}$, $s_{H,0}$ relate to the same instant of time. For example, the segments comprise a sequence of images for the same time period (here: the time period identified by index 0), but the sequence of images are encoded with a different number of bits. The segments $s_{L,1}$, $s_{M,1}$, $s_{H,1}$ relate to the time period identified by index 1. The segments $s_{L,2}$, $s_{M,2}$, $s_{H,2}$ relate to the time period identified by index 2. And the segments $s_{L,3}$, $s_{M,3}$, $s_{H,3}$ relate to the time period identified by index 3.

For example, each segment may encode a sequence of images of 2 seconds. The low bitrate data stream comprises segments encoded with a data rate of 1 mbps. This means, the 2 second image sequence has been encoded using 2 s*1 mbps=2 million bits.

The medium bitrate data stream comprises segments encoded with a data rate of 2 mbps. This means, the 2 second image sequence has been encoded using 2 s*2 mbps=4 million bits.

The high bitrate data stream comprises segments encoded with a data rate of 4 mbps. This means, the 4 second image sequence has been encoded using 2 s*4 mbps=8 million bits.

In FIG. 4, on top of each data stream, corresponding media information is provided for each segment. In the example illustrated by FIG. 4, each media information relating to a segment comprises a segment data rate (SDR) and a quality value (QV).

In other embodiments, where different bit streams are transmitted, the data rate value may, for example, be transmitted only once for a bit stream, if each segment of the bit stream has the same data rate. In the following, the media information may, for example, only specify that a segment belongs to a particular bit stream. By this, the media information indicates the segment data rate for the segment, as the information on the segment data rate is derivable from the information to which bit stream a segment belongs.

Or, in other embodiments, predefined information at the decoder may be available that defines that bit stream 1 is, for example, encoded with a bitrate of 1 mbps, that bit stream 2 is encoded with 2 mbps and that bit stream 3 is encoded with 4 mbps. In that the media information specifies that a segment belongs to a particular one of the three data streams, the media information indicates a data rate value for that segment. E.g., the media information indicates the segment data rate, if it specifies information by which the segment data rate is derivable.

In the example of FIG. 4, each segment of the low data rate bit stream has the data rate information 1 mbps. This means that a 1 second video sequence is encoded with 1 million bits. In FIG. 4, each segment of the medium data rate bit stream has the data rate information 2 mbps, what means that a 1 second video sequence is encoded with 2 million bits. Moreover, in FIG. 4, each segment of the high data rate bit stream has the data rate information 4 mbps, what means that a 1 second video sequence is encoded with 4 million bits.

In other embodiments, instead, the data rate information may indicate a data size. For example, in FIG. 4, each segment encodes a video sequence of 2 seconds. So the data rate information may indicate for each segment of the low data rate bit stream that the data size of each segment is 2 s*1 mbps=2 million bits. Likewise, the data rate information may indicate for each segment of the medium data rate bit stream that the data size of each segment is 2 s*2 mbps=4 million bits. Similarly, the data rate information may indicate for each segment of the high data rate bit stream that the data size of each segment is 2 s*4 mbps=8 million bits.

In an embodiment, an apparatus 100 for receiving selected segments receives the media information comprising the segment data rate information and the quality value information for the 12 segments illustrated in FIG. 4. Assume that the segments in FIG. 4 relate to three data streams, encoding the same video sequence but with different data rates. In such an embodiment, to decode the video, the apparatus 100 for receiving selected segments selects one segment for each instant of time or index. Each segment illustrated in FIG. 4 may encode 2 seconds of video.

Information on 4 data segments of each of the three data streams is provided, namely, information on 4 segments of the low bitrate data stream (segments $s_{L,0}$, $s_{L,1}$, $s_{L,2}$, $s_{L,3}$), information on 4 segments of the medium bitrate data stream (segments $s_{M,0}$, $s_{M,1}$, $s_{M,2}$, $s_{M,3}$), and information on 4 segments of the high bitrate data stream (segments $s_{H,0}$, $s_{H,1}$, $s_{H,2}$, $s_{H,3}$). Thus, the 4 segments of each data stream encode 8 seconds of video.

Assume that a data rate of 2 mbps (a bandwidth of 2 mbps) is available on a communication resource, for example, on a wireless connection. To replay the stream on the decoder side, on average, data segments should be selected that are encoded with bitrates of at most 2 mbps. Otherwise, if a bit stream is replayed, a first segment is received decoded and replayed (in approximately 2 seconds), but after the 2 seconds of replay of the segment, the next segment would not be available for replay, as it has not been completely transmitted over the communication resource.

However, according to embodiments, exceeding the available bandwidth for a limited time is tolerable, as long as this exceed is compensated by lower data rates of preceding or succeeding bitrates. For example, if 2 mbps are the data rate available on the communication resource, the apparatus 100 for receiving selected segments, may, for example, only request segments from the medium data rate bit stream, which are encoded with 2 mbps per second. However, it is also acceptable for the apparatus 100 to request one medium data rate 2 mbps segment, one high data rate 4 mbps segment, and, for compensation, two low data rate 1 mbps segments, as this results to an average encoded data rate of:

(2 mbps+4 mbps+1 mbps+1 mbps)/4=2 mbps.

So, according to an embodiment, the selector may, e.g., be configured to select the one or more selected segments from the plurality of media data segments, so that an average of the segment data rates of the one or more selected segments (here calculated by: (2 mbps+4 mbps+1 mbps+1 mbps)/4=8 mbps/4=2 mbps) is smaller than or equal to the available data rate (here: 2 mbps).

Moreover, the present invention is based on the finding that a quality of a media data segment note only depends on a segment data rate. If, for example, a scene of a video remains quite static, few bits are sufficient to encode the changes occurring from one image to the other in the video. However, if a lot of changes occur in a video, a lot of bits may be employed to encode the changes and still, the quality of the video might not be that good as the encoding of the video segment with few bits, where only minor changes occurred.

Based on such considerations, according to an embodiment, the selector may, e.g., be configured to select the one or more selected segments from the plurality of media data segments, so that a first average of the segment data rates of the one or more selected segments is smaller than or equal to the available data rate, and so that a first sum of the quality values of the one or more selected segments indicates a higher quality than a second sum of the quality of values of another selection of one or more media data segments, wherein a second average of the segment data rates of the media data segments of said another selection is also smaller than or equal to the available data rate.

For example, in the situation of FIG. 4, the apparatus 100 may select segment $s_{M,0}$ from the medium bitrate data stream (2 mbps) with a quality value of 0.62, the apparatus 100 may further select segment $s_{H,1}$ from the high bitrate data stream (4 mbps) with a quality value of 0.64, and the apparatus may further select segment $s_{L,2}$ (1 mbps) with a quality value of 0.58 and segment $s_{L,3}$ (1 mbps) with a quality value of 0.57 from the low bitrate data stream. The average of the segment data rate is (2 mbps+4 mbps+1 mbps+1 mbps)/4=2 mbps, which is equal to the available data rate, and which is thus acceptable. The sum of the quality values is 0.62+0.64+0.58+0.57=2.41. If, instead, the four segments from the medium bitrate data stream would have been selected, such a selection would also fulfil the condition that the average segment data rate is smaller than or equal to the available data rate (average segment data rate: (4*2 mbps/4=2 mbps). However, the sum of the quality values of such another selection would be 0.62+0.37+0.68+0.65=2.32, and thus, the sum of the quality values would be lower than in the case, where the selector 120 adaptively selects the segments from different data stream.

For example, the quality values 0.62, 0.64, 0.58 may, e.g., be structured similarity values. Or, for example, the quality values may, e.g., be peak signal-to-noise ratio values, which may, e.g., be expressed as decibel values. For example, e.g., roughly 32 dB may, e.g., be interpreted as low quality, e.g., roughly 35 dB may, e.g., be interpreted as medium quality, and e.g., roughly 38 dB may, e.g., be interpreted as high quality. Or, the quality values may be peak signal-to-noise ratio values which have been transformed from the logarithmic domain to the linear domain.

In an embodiment, the selector may, e.g., be configured to select the one or more selected segments from the plurality of media data segments, so that the quality value of each of the one or more selected segments is greater than a threshold value.

For example, the selector 120 may, for example, define that the quality value shall be better than (greater than) 0.5. The selector may at first consider a selection comprising all four segments of the medium bitrate data stream $s_{M,0}$, $s_{M,1}$, $s_{M,2}$, $s_{M,3}$. Such a selection however, would violate the condition that all segments shall have a quality value greater than 0.5, as the second segment $s_{M,1}$ has a quality value of 0.37. The selector will thus replace the second segment $s_{M,1}$ by the second segment from the high bitrate data stream $s_{H,1}$, as this segment has a quality value of 0.64, which is greater than 0.5.

However, the resulting selection now has an average segment data rate of (2 mbps+4 mbps+2 mbps+2 mbps)/4=2.5 mbps. If furthermore, the selector is configured to satisfy the condition that the average data rate shall be lower than the available data rate, which, in the example of FIG. 4 is 2 mbps, then this selection is also discarded by the selector 120. So instead of using this selection, the selector 120 will replace the third segment $s_{M,2}$ and fourth segment $s_{M,3}$ of the medium bitrate data stream, by the third segment $s_{L,2}$ and fourth segment $s_{L,3}$ of the low bitrate data stream. As the quality value of the third segment $s_{L,2}$ of the low bitrate data stream is 0.58, and as the quality value of the fourth segment $s_{L,3}$ of the low bitrate data stream is 0.57, both segments fulfil the condition that their quality value is greater than the threshold 0.5. Thus, the selector may select the found selection $s_{M,0}$, $s_{H,1}$, $s_{L,2}$, $s_{L,3}$ as its actual selection, as also the average segment data rate (2 mbps+4 mbps+1 mbps+1 mbps)/4=2 mbps) fulfils the condition to be lower than or equal to the available data rate (here: 2 mbps).

Figure 5:
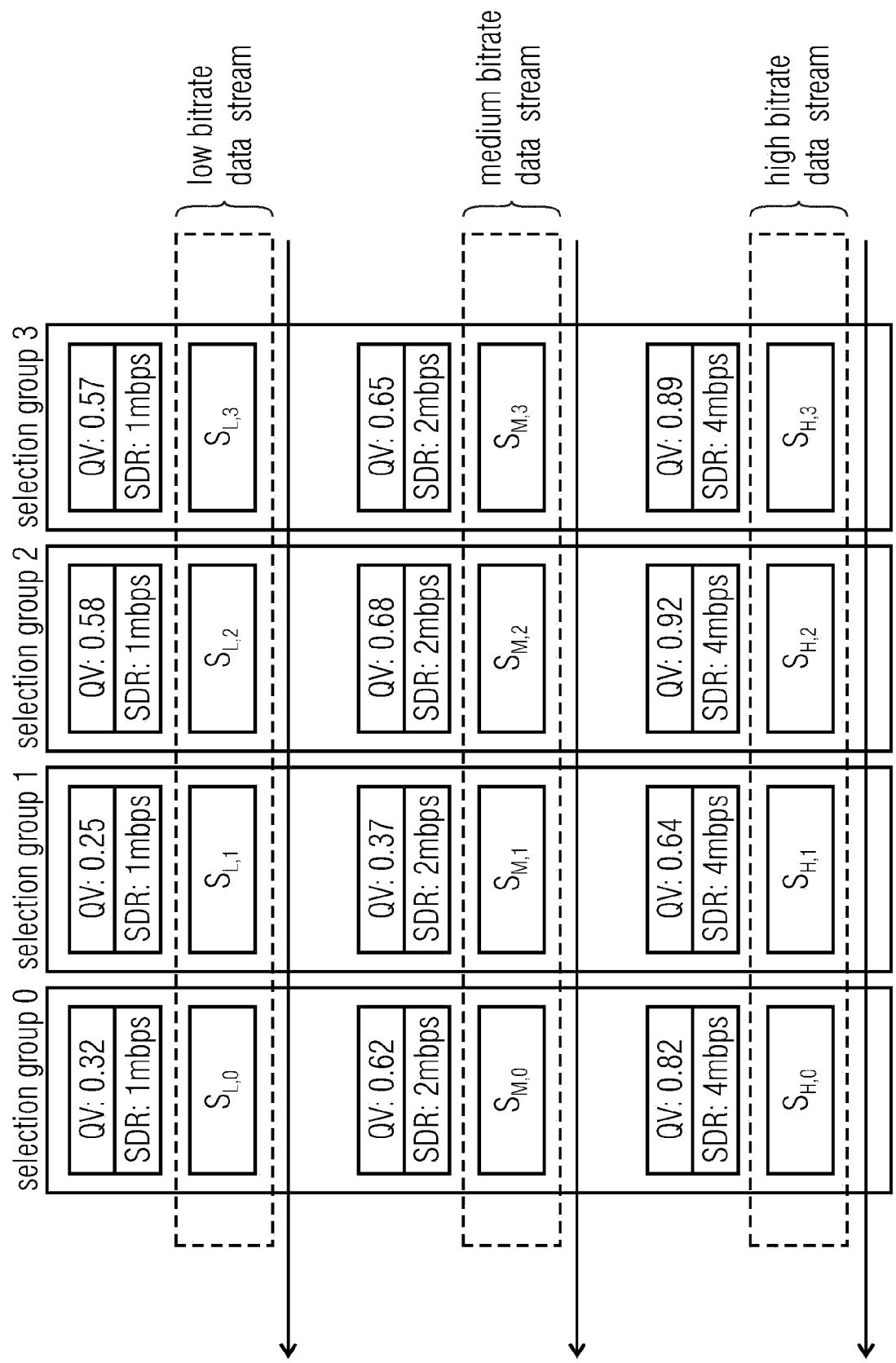
FIG. 5 illustrates three data streams and four selection groups according to an embodiment.

The above considerations can be summarized with reference to FIG. 5. FIG. 5 illustrates three data streams and four selection groups according to an embodiment.

According to the embodiment illustrated by FIG. 5, an index or an instant of time is assigned to each of the plurality of media data segments. In FIG. 5, index 0, here, a time index, is assigned to the segments $s_{L,0}$, $s_{M,0}$ and $s_{H,0}$; time index 1 is assigned to the segments $s_{L,1}$, $s_{M,1}$ and $s_{H,1}$; time index 2 is assigned to the segments $s_{L,2}$, $s_{M,2}$ and $s_{H,2}$; and time index 3 is assigned to the segments $s_{L,3}$, $s_{M,3}$ and $s_{H,3}$.

Each of the plurality of media data segments is assigned to exactly one of a plurality of data streams. In FIG. 5, segments $s_{L,0}$, $s_{L,1}$, $s_{L,2}$ and $s_{L,3}$ are assigned to the low bitrate data stream, and not to any other data stream, segments $s_{M,0}$, $s_{M,1}$, $s_{M,2}$ and $s_{M,3}$ are assigned to the medium bitrate data stream, and segments $s_{H,0}$, $s_{H,1}$, $s_{H,2}$ and $s_{H,3}$ are assigned to the high bitrate data stream.

Moreover, each of the plurality of media data segments is assigned to exactly one of one or more selection groups. The index or the instant of time of each of the media data segments of each selection group of the one or more selection groups is equal to the index or the instant of time of every other media data segment of said selection group. In FIG. 5, four selection groups are illustrated, namely, selection group 0, selection group 1, selection group 2 and selection group 3. The segments $s_{L,0}$, $s_{M,0}$ and $s_{H,0}$ having time index 0 are assigned to selection group 0, and are not assigned to any other selection group. The segments $s_{L,1}$, $s_{M,1}$ and $s_{H,1}$ having time index 1 are assigned to selection group 1. The segments $s_{L,2}$, $s_{M,2}$ and $s_{H,2}$ having time index 2 are assigned to selection group 2. And the segments $s_{L,3}$, $s_{M,3}$ and $s_{H,3}$ having time index 3 are assigned to selection group 3. Each of the one or more selection groups comprises exactly one media data segment from each of the plurality of data streams.

The index or the instant of time of each of the plurality of media data segments of each data stream differs from the index or the instant of time of every other media data segment of said data stream. In FIG. 5 the segments $s_{L,0}$, $s_{L,1}$, $s_{L,2}$ and $s_{L,3}$ of the low bitrate data stream each have a different time index, namely, time index 0, 1, 2 or 3. Likewise, the segments $s_{M,0}$, $s_{M,1}$, $s_{M,2}$ and $s_{M,3}$ of the medium bitrate data stream each have a different time index. Similarly, the segments $s_{H,0}$, $s_{H,1}$, $s_{H,2}$ and $s_{H,3}$ of the high bitrate data stream each have a different time index.

In an embodiment, wherein the selector 120 is configured to select, depending on the segment data rates of the plurality of media data segments, depending on the quality values of the plurality of media data segments and depending on an available data rate of the communication resource, at least one of the media data segments from each of the one or more selection groups as the one or more selected segments.

In a particular embodiment, the selector 120 is configured to select, depending on the segment data rates of the plurality of media data segments, depending on the quality values of the plurality of media data segments and depending on an available data rate of the communication resource, exactly one of the media data segments from each of the one or more selection groups as the one or more selected segments. For example, the selector 120 may select segment $s_{M,0}$ from selection group 0, the selector 120 may select segment $s_{H,1}$ from selection group 1, the selector 120 may select segment $s_{L,2}$ from selection group 2, and the selector 120 may select segment $s_{L,3}$ from selection group 0, and by this, the selected segments are $s_{M,0}$, $s_{H,1}$, $s_{L,2}$ and $s_{L,3}$.

As already stated above, the selector 120 is configured to select the segments depending on the segment data rates of the plurality of media data segments, depending on the quality values of the plurality of media data segments and depending on an available data rate of a communication resource.

According to an embodiment, for each data stream of the plurality of data streams, the segment data rate of each segment of said data stream is equal. In FIG. 5, the low bitrate data stream has a segment data rate of 1 mbps, which is equal for each segment of the low bitrate data stream, the medium bitrate data stream has a segment data rate of 2 mbps, which is equal for each segment of the medium bitrate data stream, and the high bitrate data stream has a segment data rate of 4 mbps, which is also equal for each segment of the high bitrate data stream.

In practice, slight deviations of the bitrate may occur, so that not all segments of a data stream, e.g., of the medium bitrate data stream, may have exactly the same bitrate of 2 mbps. For example, some segments may, e.g., have a bit rate of 1.95 mbps, and some others may have a bit rate of 2.05 mbps, but despite such minor deviations, such bit rates with minor deviations shall, in general, be considered as being equal. In some embodiments, the media information, e.g., a manifest file, may still characterize such minor deviating bitrates as equal bitrates. For example, the media information (e.g., the manifest file) may, e.g., assign a bitrate of 2 mbps to the segment with a 2.05 mbps bitrate as well as to the segment with a 1.95 mbps bitrate.

In an embodiment, each of the plurality of media data segments is assigned to exactly one of two or more selection groups. Each of the two or more selection groups comprises exactly one media data segment from each of the plurality of data streams. The selector is configured to select, depending on the segment data rates of the plurality of media data segments, depending on the quality values of the plurality of media data segments and depending on an available data rate of the communication resource, exactly one of the media data segments from each of the two or more selection groups. In FIG. 5, four selection groups exist.

In an embodiment, the quality value of each of the plurality of segment descriptions may, e.g., indicate or depend on a peak signal-to-noise ratio, or depends on a structured similarity value, or depends on a mean opinion score, or depends on a quality metric retrieved by perceptual evaluation of video quality, or depends on a quality metric retrieved by a media delivery index, or depends on a quantization parameter of one of the plurality of media data segments.

A peak signal-to-noise ratio, e.g., indicates the ratio between the maximum possible power of a signal and the power of corrupting noise. The peak signal-to-noise ratio is a quality measure well known in the art.

A structured similarity value/a structured similarity indicates a measure for a similarity of two images, for example, a similarity between an image the quality of which shall be indicated and a reference image. For example, to determine a structured similarity of an encoded image, the encoded image may be decoded and may be compared, e.g., by determining a variance with respect to the reference image. The structured similarity is a quality measure also well known in the art.

A mean opinion score is a test that is used to obtain a users view on a quality. The mean opinion score is well known in the art.

Quality metrics, such as a perceptual evaluation of a video quality is a standardized end to end measurement algorithm to evaluate the quality, for example, of pictures of a video, and are also well known in the art. Moreover, the media delivery index is also well known in the art.

A quantization parameter of a media data segment may indicate in which quantization steps media data is quantized. The use of quantization parameters is also well known in the art.

When a sum of qualities is determined, embodiments may convert values that are expressed in a logarithmic domain to a linear domain to obtain useful results. For example, if peak-signal-to-noise ratios (PSNRs) are expressed in a logarithmic domain, the PSNRs are at first converted from a logarithmic domain to a linear domain and these linear-domain values are then added. Still, the resulting sum depends on the original peak signal-to-noise ratios.

According to an embodiment, the quality value indicated by the media information for each media data segment of the plurality of media data segments is a first quality value of said media data segment, and wherein the media information may, e.g., further indicate a second quality value for each of the plurality of media data segments. The selector may, e.g., be configured to select the one or more selected segments from the plurality of media data segments, so that the first quality value of each of the one or more selected segments is greater than a first threshold value, and so that the second quality value of each of the one or more selected segments is greater than a second threshold value.

In such an embodiment, two different quality values of a segment are considered and the considered segment is only acceptable as a selection candidate, if both quality values greater than the respective threshold value. For example, e.g., the peak signal-to-noise ratio and, e.g., the structured similarity value of a media data segment may both be taken into account, when the selector 120 determines which media data segments are selected.

On the side of the apparatus 200 for transmitting the selected segments, according to an embodiment, the processor 220 may, e.g., be configured to generate the media information so that the quality value of each of the plurality of segment descriptions, being comprised by the media information, depends on a peak signal-to-noise ratio, or depends on a structured similarity value, or depends on a mean opinion score, or depends on a quality metric retrieved by perceptual evaluation of video quality, or depends on a quality metric retrieved by a media delivery index, or depends on a quantization parameter of one of the plurality of media data segments.

Moreover, in an embodiment, the quality value indicated by the media information for each media data segment of the plurality of media data segments may, e.g., be a first quality value of said media data segment. The processor 220 may, e.g., be configured to generate the media information so that the media information further indicates a second quality value for each of the plurality of media data segments.

FIG. 6 illustrates a bit stream according to an embodiment. The bit stream comprises segment data rate information indicating one or more segment data rates for the plurality of media data segments, and quality information indicating one or more quality values the plurality of media data segments. In reality, the numbers indicated in FIG. 6, e.g., 1 mbps, 0.32, 0.25, etc. are encoded as a sequence of bits. "SDR" indicates a segment data rate for the subsequent segments, the quality values of which follow in the bit stream. "QV" indicates a quality value of a segment.

For example, in FIG. 6, the bit stream comprises an introducing segment data rate for each media data segment of the low bitrate data stream of FIGS. 4 and 5, and a quality value for each of the segments of the low bitrate data stream. Moreover, the bit stream comprises an introducing segment data rate for each media data segment of the medium bitrate data stream of FIGS. 4 and 5, and a quality value for each of the segments of the medium bitrate data stream. Furthermore, the bit stream comprises an introducing segment data rate for each media data segment of the high bitrate data stream of FIGS. 4 and 5, and a quality value for each of the segments of the high bitrate data stream.

According to another embodiment, the bit stream may, e.g., comprise at least two quality values for each of the plurality of media data segments. For example, for each of the media data segments of FIGS. 4 and 5, the bit stream may comprise a first quality value indicating a peak signal-to-noise ratio and a second quality value indicating a structured similarity value.

In an embodiment, the description files/manifest files of the MPEG-DASH, Apple® HLS, Microsoft® Smooth Streaming or Adobe® HDS may be adapted so that they comprise the additional quality information, e.g., the quality values, as described above.

In an embodiment, the processor 220 of the apparatus 200 for transmitting the selected segments is configured to generate a first file comprising a first portion of the media information, said first portion indicating the segment data rates of the plurality of media data segments. Moreover, the processor 220 of the apparatus 200 for transmitting the selected segments is configured to generate a second file comprising a second portion of the media information, said second portion indicating the quality values of the plurality of media data segments. The interface 210 of the apparatus 200 for transmitting the selected segments is configured to transmit the first file and the second file.

According to an embodiment, wherein the interface 110 of the apparatus 100 for receiving the selected segments is configured to receive a first file comprising a first portion of the media information, said first portion indicating the segment data rates of the plurality of media data segments. Moreover, the interface 110 of the apparatus 100 for receiving the selected segments is configured to receive a second file comprising a second portion of the media information, said second portion indicating the quality values of the plurality of media data segments.

For example, as described above, the data rate information (e.g., the bitrate information) may be comprised by the above-described first file, and the quality information (e.g., the quality values) may be comprised by the above-described second file. By this, standard conformity is achieved as the bitrate information is comprised by said first file (e.g., a manifest file) in a standard-conform way, and the quality information (not described in state-of-the-art standards) is comprised by said (additional) second file.

According to some embodiments, the selector 120 is configured to select, depending on the segment data rates of the plurality of media data segments, depending on the quality values of the plurality of media data segments and depending on an available data rate of the communication resource, at least one of the media data segments from each of the one or more selection groups as the one or more selected segments.

In a particular embodiment, one of the data streams is a base layer and the one or more other data streams are one or more enhancement layers. The one or more enhancement layers allow to scalably increase the quality, e.g. by employing concepts of differential encoding. For example, by decoding only the base layer data stream only, for example, an image or video is decoded with a first quality. By together decoding the base layer data stream and a first one of the enhancement layers, the image or the video is decoded with a second quality being higher than the first quality. By together decoding the base layer data stream and said first one of the enhancement layers and a second one of the enhancement layers, the image or the video is decoded with a third quality being higher than the second quality.

In an embodiment, the plurality of data streams comprise a base layer data stream and one or more enhancement layer data streams. The base layer data stream and the one or more enhancement layer data streams are ordered, said order starting from the base layer data stream, followed by the enhancement layer data stream with the lowest quality, etc., and said order ends at the enhancement layer data stream with the highest quality.

For example, the quality value of each of the media data segments of the base layer data stream indicates a quality of the content of the media data when being decoded using only said media data segment of the base layer. For example, the quality value of each of the media data segments of each of the one or more enhancement layer data streams indicates a quality of the content of the media data when being decoded using the media data segment of the base layer corresponding to said media data segment (the media data segment from the same selection group) of said enhancement layer data stream, using the media data segments, which correspond to said media data segment of said enhancement layer data stream, of all enhancement layer data streams having a lower quality than said enhancement layer data stream, and using said media data segment of said enhancement layer data stream.

For example, the media data segment with time index 5 of enhancement layer 3 is considered. Then, the corresponding media data segments used for decoding are the media data segment with time index 5 of the base layer data stream, the media data segment with time index 5 of enhancement layer data stream 1, the media data segment with time index 5 of enhancement layer data stream 2, and the media data segment with time index 5 of enhancement layer data stream 3. Media data segments with time index 5 of higher enhancement layers 4) are not considered. Then, the quality value of the media data segment with time index 5 of enhancement layer 3 indicates a quality of the content of the media data when being decoded using the media data segment with time index 5 of the base layer data stream, the media data segment with time index 5 of enhancement layer data stream 1, the media data segment with time index 5 of enhancement layer data stream 2, and the media data segment with time index 5 of enhancement layer data stream 3.

So, according to an embodiment, wherein the selector 120 is configured to select the at least one of the media data segments from each of the one or more selection groups, depending on the segment data rates of the plurality of media data segments, depending on the quality values of the plurality of media data segments and depending on an available data rate of the communication resource, and depending on the order of the plurality of data streams.

In an embodiment, the selector 120 is configured to not select a second media data segment of a second one of the data streams from a selection group, if a first media data segment of a first one of the data streams from said selection group is not also selected by the selector 120 or if said first media data segment of said first one of the data streams from said selection group has not been previously selected by the selector 120, said first one of the data streams preceding the second one of the data streams in the order of the data streams. Here, the selection group defines that the media data segments of said selection group have the same index or relate to the same instant of time. As the first one of the data streams precedes the second one of the data streams in the order of the data streams, the first one of the data streams is, e.g., a lower enhancement layer than the second one of the data streams, or the first one of the data streams is the base layer data stream.

In the following, constant quality streaming versus constant bitrate streaming is considered.

Most of the proposed adaptation algorithms for adaptive streaming take only the bitrate of the media content into account, and do not consider the quality of the content. Taking the quality into account is especially important as multimedia content comes together with variations in complexity and scenes, and thus cannot be encoded at the same efficiency resulting in the same bitrate for all parts of a media sequence. In the case of video, e.g., complex scenes with much details and much motion are harder to compress, compared to slow-motion scenes or scenes with less details. Thus, targeting for a constant bitrate for multimedia content results in changing quality during a longer media sequence.

In embodiments, concepts are provided to enable a constant quality streaming in adaptive streaming systems of multimedia data.

In the following, a generic optimization model, a 0-1 knapsack is considered.

Some embodiments employ the 0-1 knapsack problem as a starting point for a constant quality optimization within an adaptive media streaming system. The knapsack problem is a real-world decision making problem, which can be applied in may scenarios, like also for adaptive media streaming.

Some embodiments operate as follows:

Maximize $$\sum_{i=1}^{n} v_i x_i$$

subject to $$\sum_{i=1}^{n} w_i x_i \leq W, x_i \in \{0, 1\}$$

The solving of knapsack problems is NP-hard, but there are several algorithms available to solve it in polynomial time based on dynamic programming approach [6], branch and bound approach [7], or hybridizations of both approaches [8], [9], [10].

In the following, constant quality adaptation is considered.

In embodiments, the generic 0-1 knapsack problem is modified to a Constant Quality Adaptation Logic for adaptive streaming of multimedia content. In case of adaptive media streaming, there would be different version of a multimedia content available, which is split up to small segments/chunks which are retrieved by the client. Each of these segments has a certain quality, which represents the value (i.e. benefit for the user) of the knapsack problem. However, each segment also has a bitrate at which it is encoded, and which represents the weight for the knapsack problem. As the bandwidth to transfer the bitrate is limited, the adaptation algorithm has to decide which segments to download via this bottleneck within a certain time to achieve the best possible quality.

This optimization is formulated as follows:

$$\text{maximize} \sum_{i=k+1}^{k+w} q_{x,i}$$

$q_{x,i}$ ... Quality of Representation Index x, of the segment i
w ... number of segments used in the optimization
k ... segment number where to start optimization from
subject to $$\sum_{i=k+1}^{k+w} b_{x,i} \leq bw_k * w$$

Bitrate of Representation Index x, of the segment i
w ... number of segments used in the optimization
k ... segment number where to start optimization from
$bw_i$ ... bandwidth prediction for the Segment i
k can be the current playback segment number, the last downloaded segment of the client and any other segment.

In the following, constant quality adaptation in case of layered multimedia data is considered.

This is the problem in case of a layered multimedia codec, e.g., h.264 SVC, HEVC Scalable Extentions, etc.

$$\text{maximize} \sum_{i=k+1}^{k+w} q_{x,i}$$

$q_{x,i}$ ... Quality of Representation Index x, of the segment i,
w ... number of segments used in the optimization
k ... segment number where to start optimization from
subject to $$\sum_{i=k+1}^{k+w} \sum_{j=0}^{x} b_{i,j} \leq bw_k * w$$

$b_{x,i}$ ... Bitrate of Representation Index x, of the segment i
w ... number of segments used in the optimization
k ... segment number where to start optimization from
$bw_i$ ... bandwidth predition for the Segment i
k can be the current playback segment number, the last downloaded segment of the client and any other segment.

In the following, constant quality adaptation in case of multiple media types is considered.

This can be used when the optimization includes multiple types of media, e.g., video combined with audio, etc.

$$\text{maximize} \sum_{j=1}^{n} \sum_{i=k+1}^{k+w} q_{x,i,j}$$

n ... number of media types consumed
$q_{x,i,j}$ ... Quality of Representation Index x, of the segment i, of the media type j
w ... number of segments used in the optimization
k ... segment number where to start optimization from
subject to $$\sum_{j=1}^{n} \sum_{i=k+1}^{k+w} b_{x,i,j} \leq bw_k * w$$

$x_i$ ... Representation Index of Segment i
$b_{x,i,j}$ ... Bitrate of Representation Index x, of the segment i, of the media type j
w ... number of segments used in the optimization
k ... segment number where to start optimization from
$bw_i$ ... bandwidth predition at the Segment i
k can be the current playback segment number, the last downloaded segment of the client and any other segment.

In the following, limitations for the optimization is considered.

The number of segments used for the optimization (windows w) may be
- a fixed value of the device
- adjusted to the current buffer fill level (buff_level)
- adjusted to the variation of the bandwidth
- adjusted to the type of network interface (e.g., fixed access network, Wireless network, Cellular network, etc.)
- adjusted by the Internet Service Provider
- adjusted by the Content Provider In addition to this, the adaptation optimization may be subject to further conditions, such as
- The resolution of any segment within the optimization window w may be limited by a maximum resolution max_res
- The resolution of any segment within the optimization window w may be limited by a minimum resolution min_res
- The bitrate of any segment within the optimization window w may be limited by a maximum bitrate max_bitrate The bitrate of any segment within the optimization window w may be limited by a minimum bitrate min_bitrate The quality factor of any segment within the optimization window w may be limited by a maximum quality max_quali The quality factor of any segment within the optimization window w may be limited by a minimum quality min_quali The parameters min_res, max_res, min_quali, max_quali, min_bitrate, max_bitrate may be
  fixed values for the device
  adjusted to the current network condition by the content provider
  adjusted to the current network condition by the internet service provider
  adjusted to the current network condition by the overlay network provider
  adjusted by the client during the streaming session The quality level of a segment of a representation of the multimedia content can be signaled via
  the manifest file (MPD in the case of MPEG-DASH, M3U8 in the case of Apple HLS, etc.) which describes the adaptive streaming content
  an additional file that associates quality information to the different content representations and segments, respectively
  additional quality information within the media files (e.g., embedded a box of MP4/Iso Base Media File Format, headers within MPEG2-TS, etc.), describing the current and/or the subsequent segments of one or more representations.

The quality level information can be any information describing the quality of the media content of a media segment. This can be, but is not limited to, a value per segment showing
  the Peak signal-to-noise ratio (PSNR) of the given segment of the given representation
  the Structured Similarity Value (SSIM) of the segment
  the Mean Opinion Score (MOS) or any other subjective quality assessment value, which is achieve either by a quality assessment function or a subjective evaluation of the content
  a quality metric retrieved by Perceptual Evaluation of Video Quality (PEVQ)
  a quality metric retrieved by an Media Delivery Index (MDI)
  the used Quantization Parameter (QP) used in the encoding of the content
  any other quality measurement metric The optimization may also be subject to restriction based on the media buffer, e.g., its size and fill level, on the client. This could be $$\sum_{i=k+1}^{k+w} length_{x_i} = \sum_{j=k-w}^{k} length_{x_j} \pm \alpha * \sum_{j=k-w}^{k} length_{x_j}$$

or $$\sum_{i=k+1}^{k+w} b_{x_i} = \sum_{j=k-w}^{k} b_{x_j} \pm \alpha * \sum_{j=k-w}^{k} b_{x_j}$$

or $$\sum_{i=k+1}^{k+w} q_{x_i} = \sum_{j=k-w}^{k} q_{x_j} \pm \alpha * \sum_{j=k-w}^{k} q_{x_j}$$

where $\alpha$ is a factor to limit the change of the sums, e.g., limit the amount of quality change over time.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Sandvine, *Global Internet Phenomena Report 1H 2013*, Sandvine Intelligent Broadband Networks, 2013.
[2] Schonfeld, E. 2011, Netflix Now The Largest Single Source of Internet Traffic In North America, Tech Crunch, May. 17, Available: http://techcrunch.com/2011/05/17/netflix-largest-internet-traffic/(last access: May. 2012).
[3] ISO/IEC DIS 23009-1.2, *Information technology—Dynamic adaptive streaming over HTTP (DASH)—Part 1: Media presentation description and segment formats*
[4] Stockhammer, T. 2011, Dynamic Adaptive Streaming over HTTP—Design Principles and Standards", In *Proceedings of the Second Annual ACM Conference on Multimedia Systems* (MMSys11), ACM, New York, N.Y., USA, 133-144.
[5] I. Sodagar, "The MPEG-DASH Standard for Multimedia Streaming Over the Internet," IEEE MultiMedia, vol. 18, no. 4, pp. 62-67, 2011.
[6] Rumen Andonov, Vincent Poirriez, Sanjay Rajopadhye (2000) Unbounded Knapsack Problem: dynamic programming revisited European Journal of Operational Research 123: 2. 168-181 http://dx.doi.org/10.1016/S0377-2217(99)00265-9
[7] S. Martello, P. Toth, Knapsack Problems: Algorithms and Computer Implementation, John Wiley and Sons, 1990
[8] S. Martello, D. Pisinger, P. Toth, Dynamic programming and strong bounds for the 0-1 knapsack problem, Manag. Sci., 45:414-424, 1999.
[9] G. Plateau, M. Elkihel, A hybrid algorithm for the 0-1 knapsack problem, Methods of Oper. Res., 49:277-293, 1985.
[10] S. Martello, P. Toth, A mixture of dynamic programming and branch-and-bound for the subset-sum problem, Manag. Sci., 30:765-771
[11] Muller, C. and Renzi, D. and Lederer, S. and Battista, S. and Timmerer, C. Using Scalable Video Coding for Dynamic Adaptive Streaming over HTTP in Mobile Environments. *Signal Processing Conference (EUSIPCO)*, 2012 *Proceedings of the* 20*th European*, pages 2208-2212, 2012.
[12] Müller, Christopher and Lederer, Stefan and Timmerer, Christian. An Evaluation of Dynamic Adaptive Streaming over HTTP in Vehicular Environments. *Proceedings of the* 4*th Workshop on Mobile Video* in MoVid '12, pages 37-42, New York, N.Y., USA, 2012. ACM.

The invention claimed is:

1. An apparatus, comprising:
an interface for receiving media information, wherein the media information indicates a segment data rate for each of a plurality of media data segments and further indicates a quality value for each of the plurality of media data segments, and
a selector for selecting one or more selected segments from the plurality of the media data segments depending on the segment data rates of the plurality of media data segments, depending on the quality values of the plurality of media data segments and depending on an available data rate of a communication resource,
wherein the interface is configured to transmit a request requesting the one or more selected segments, and
wherein the interface is configured to receive the one or more selected segments being transmitted on the communication resource,
wherein an index or an instant of time is assigned to each of the plurality of media data segments,
wherein each of the plurality of media data segments is assigned to exactly one of a plurality of data streams,
wherein each of the plurality of media data segments is assigned to exactly one of two or more selection groups,
wherein the index or the instant of time of each of the media data segments of each selection group of the two or more selection groups is equal to the index or the instant of time of every other media data segment of said selection group,
wherein each of the two or more selection groups comprises exactly one media data segment from each of the plurality of data streams,
wherein the index or the instant of time of each of the media data segments of each data stream differs from the index or the instant of time of every other media data segment of said data stream,
wherein the plurality of data streams forms an order, said order starting from a base layer data stream of the plurality of data streams, followed by enhancement layer data streams of the plurality of data streams ordered by quality, and
wherein the selector is configured to select, depending on the segment data rates of the plurality of media data segments and depending on the quality values of the plurality of media data segments and depending on the available data rate of the communication resource, and depending on the order of the plurality of data streams, at least one of the media data segments from each of the two or more selection groups as the one or more selected segments.

2. The apparatus according to claim 1, wherein the selector is configured to select, depending on the segment data rates of the plurality of media data segments, depending on the quality values of the plurality of media data segments and depending on the available data rate of the communication resource, exactly one of the media data segments from each of the one or more selection groups as the one or more selected segments.

3. The apparatus according to claim 1, wherein the plurality of data streams form an order, and wherein the selector is configured to select the at least one of the media data segments from each of the one or more selection groups, depending on the segment data rates of the plurality of media data segments and depending on the available data rate of the communication resource, and depending on the order of the plurality of data streams.

4. The apparatus according to claim 3, wherein the selector is configured to not select a second media data segment of a second one of the data streams from a selection group of the one or more selection groups, if a first media data segment of a first one of the data streams from said selection group is not also selected by the selector, or if said first media data segment of said first one of the data streams from said selection group has not been previously selected by the selector, wherein said first one of the data streams precedes the second one of the data streams in the order of the data streams.

5. The apparatus according to 1, wherein each of the plurality of media data segments is assigned to exactly one of two or more selection groups, wherein each of the two or more selection groups comprises exactly one media data segment from each of the plurality of data streams, and wherein the selector is configured to select, depending on the segment data rates of the plurality of media data segments, depending on the quality values of the plurality of media data segments and depending on the available data rate of the communication resource, at least one of the media data segments from each of the two or more selection groups as the one or more selected segments.

6. The apparatus according to claim 1, wherein the selector is configured to select the one or more selected segments from the plurality of media data segments, so that an average of the segment data rates of the one or more selected segments is smaller than or equal to the available data rate.

7. The apparatus according to claim 1, wherein the selector is configured to select the one or more selected segments from the plurality of media data segments, so that a first average of the segment data rates of the one or more selected segments is smaller than or equal to the available data rate, and so that a first sum of the quality values of the one or more selected segments indicates a higher quality than a second sum of the quality of values of another selection of one or more media data segments, wherein a second average of the segment data rates of the media data segments of said another selection is also smaller than or equal to the available data rate.

8. The apparatus according to claim 1,
wherein the quality value indicated by the media information for each media data segment of the plurality of media data segments is a first quality value of said media data segment, and wherein the media information further indicates a second quality value for each of the plurality of media data segments, and
wherein the selector is configured to select the one or more selected segments from the plurality of media data segments, so that the first quality value of each of the one or more selected segments is greater than a first threshold value, and so that the second quality value of each of the one or more selected segments is greater than a second threshold value.

9. The apparatus according to claim 1, wherein the quality value of each of the plurality of segment descriptions depends on a peak signal-to-noise ratio, or depends on a structured similarity value, or depends on a mean opinion score, or depends on a quality metric retrieved by perceptual evaluation of video quality, or depends on a quality metric retrieved by a media delivery index, or depends on a quantization parameter of one of the plurality of media data segments.

10. The apparatus according to claim 1,
wherein the interface is configured to receive a first file comprising a first portion of the media information, said first portion indicating the segment data rates of the plurality of media data segments, and
wherein the interface is configured to receive a second file comprising a second portion of the media information, said second portion indicating the quality values of the plurality of media data segments.

11. A system, comprising:
an apparatus according to claim 1, and
an apparatus for transmitting selected segments, comprising: a processor for generating media information so that the media information indicates a segment data rate for each of a plurality of media data segments and further indicates a quality value for each of the plurality of media data segments, and an interface for transmitting the media information, wherein the interface is configured to receive a request requesting one or more selected segments from the plurality of media data segments, and wherein the interface is configured to transmit the one or more selected segments when the request requesting the one or more requested segments is received,
wherein the processor of the apparatus for transmitting selected segments is configured to generate media information so that the media information indicates a segment data rate for each of a plurality of media data segments and further indicates a quality value for each of the plurality of media data segments,
wherein the interface of the apparatus for transmitting selected segments is configured to transmit the media information to the apparatus according to claim 1,
wherein the interface of the apparatus according to claim 1 is configured to receive the media information from the apparatus for transmitting selected segments,
wherein the selector of the apparatus according to claim 1 is configured to select one or more selected segments from the plurality of the media data segments depending on the segment data rates of the plurality of media data segments, depending on the quality values of the plurality of media data segments and depending on an available data rate of a communication resource,
wherein the selector of the apparatus according to claim 1 is configured to select the one or more selected segments from the plurality of media data segments, so that the quality value of each of the one or more selected segments is greater than a threshold value,
wherein the interface of the apparatus according to claim 1 is configured to transmit a request requesting the one or more selected segments,
wherein the interface of the apparatus for transmitting selected segments is configured to receive the request requesting one or more selected segments from the plurality of available segments,
wherein the interface of the apparatus for transmitting selected segments is configured to transmit the one or more selected segments when the request requesting the one or more requested segments is received, and
wherein the interface of the apparatus according to claim 1 is configured to receive the one or more selected segments being transmitted on the communication resource.

12. The system according to claim 11, wherein the processor is configured to generate the media information so that the quality value of each of the plurality of segment descriptions, being comprised by the media information, depends on a peak signal-to-noise ratio, or depends on a structured similarity value, or depends on a mean opinion score, or depends on a quality metric retrieved by perceptual evaluation of video quality, or depends on a quality metric retrieved by a media delivery index, or depends on a quantization parameter of one of the plurality of media data segments.

13. The system according to claim 11,
wherein the quality value indicated by the media information for each media data segment of the plurality of media data segments is a first quality value of said media data segment, and
wherein the processor is configured to generate the media information so that the media information further indicates a second quality value for each of the plurality of media data segments.

14. The system according to claim 11,
wherein the processor is configured to generate a first file comprising a first portion of the media information, said first portion indicating the segment data rates of the plurality of media data segments,
wherein the processor is configured to generate a second file comprising a second portion of the media information, said second portion indicating the quality values of the plurality of media data segments, and
wherein the interface is configured to transmit the first file and the second file.

15. A method, comprising:
receiving media information, wherein the media information indicates a segment data rate for each of a plurality of media data segments and further indicates a quality value for each of the plurality of media data segments,
selecting one or more selected segments from the plurality of the media data segments depending on the segment data rates of the plurality of media data segments, depending on the quality values of the plurality of media data segments and depending on an available data rate of a communication resource,
wherein selecting the one or more selected segments from the plurality of media data segments is conducted, so that the quality value of each of the one or more selected segments is greater than a threshold value,
transmitting a request requesting the one or more selected segments, and
receiving the one or more selected segments being transmitted on the communication resource,
wherein an index or an instant of time is assigned to each of the plurality of media data segments,
wherein each of the plurality of media data segments is assigned to exactly one of a plurality of data streams,
wherein each of the plurality of media data segments is assigned to exactly one of two or more selection groups,
wherein the index or the instant of time of each of the media data segments of each selection group of the two or more selection groups is equal to the index or the instant of time of every other media data segment of said selection group,
wherein each of the two or more selection groups comprises exactly one media data segment from each of the plurality of data streams,
wherein the index or the instant of time of each of the media data segments of each data stream differs from the index or the instant of time of every other media data segment of said data stream, and
wherein the plurality of data streams forms an order, said order starting from a base layer data stream of the plurality of data streams, followed by enhancement layer data streams of the plurality of data streams ordered by quality, and
wherein selecting the one or more selected segments is conducted depending on the segment data rates of the plurality of media data segments and depending on the quality values of the plurality of media data segments and depending on the available data rate of the communication resource, and depending on the order of the plurality of data streams, at least one of the media data segments from each of the two or more selection groups as the one or more selected segments.

16. A non-transitory digital storage medium having stored thereon a computer program for implementing the method of claim 15 when said computer program is run by a computer.

* * * * *